United States Patent [19]

Hollis

[11] 4,168,253

[45] Sep. 18, 1979

[54] EXTENDING THE MOLTEN STABILITY OF POLY(ETHYLENE-VINYL ACETATE) HOT-MELT ADHESIVES

[75] Inventor: Samuel D. Hollis, Savannah, Ga.

[73] Assignee: Union Camp Corporation, Wayne, N.J.

[21] Appl. No.: 872,042

[22] Filed: Jan. 25, 1978

[51] Int. Cl.² ............................................. C08L 93/00
[52] U.S. Cl. .............................. 260/27 EV; 260/97.5; 427/385 A; 427/388 R; 427/395; 428/461
[58] Field of Search ........................... 260/27 EV, 97.5

[56] References Cited

U.S. PATENT DOCUMENTS

| | | | |
|---|---|---|---|
| 3,560,420 | 2/1971 | Tamura et al. | 260/25 |
| 3,657,171 | 4/1972 | White | 260/27 EV |

*Primary Examiner*—Melvyn I. Marquis
*Attorney, Agent, or Firm*—Kane, Dalsimer, Kane, Sullivan and Kurucz

[57] ABSTRACT

The disclosure is of a method for extending the molten stability of ethylene-vinyl acetate (EVAc) copolymers. One embodiment of the method comprises mixing a lithium salt in the adhesive compositions. The disclosure is also of EVAc-based hot-melt adhesive compositions prepared by the method of the invention and characterized in part by their stability in the molten state.

8 Claims, No Drawings

EXTENDING THE MOLTEN STABILITY OF POLY(ETHYLENE-VINYL ACETATE) HOT-MELT ADHESIVES

BACKGROUND OF THE INVENTION

1. Field of the Invention

The invention relates to ethylene-vinyl acetate copolymer (hereinafter referred to as EVAc) hot-melt adhesives and more particularly relates to such adhesives having extended molten stability and to methods of their preparation.

2. Brief Description of the Prior Art

EVAc-based hot-melt adhesives, their preparation and methods of use are well known in the art; see for example U.S. Pat. No. 3,560,420. These adhesives compositions are used extensively in packaging, laminating and bookbinding. However, their use in typical application apparatus is impaired by the tendency of these hot-melt adhesive compositions to exhibit relatively short pot-lives; i.e.; fluid stability under molten conditions. Generally viscosity increases or gelation and a "skinning" over of air exposed surfaces occurs within relatively short periods of time after initial melting. Almost all EVAc adhesives contain a thermoplastic, modifying resin as a major component which is known as a tackifier. Tackifiers increase the adhesion and lower the viscosity of hot-melt adhesives. The improvement in adhesion is believed to be a result of improved wetting.

The method of the invention is advantageous in that it significantly increases the hot melt stability of EVAc-based hot-melt adhesives. This permits an operator to employ apparatus with a greater time latitude and to melt the adhesive compositions well in advance of its application. This provides more flexibility in use of the adhesives.

SUMMARY OF THE INVENTION

The invention comprises a method of increasing the molten stability of rosin ester tackified, EVAc-based, hot-melt adhesive compositions which comprises; mixing with said compositions soluble lithium metal ion.

The invention also comprises rosin ester tackified, EVAc-based, hot-melt adhesive compositions which include lithium metal ion as an ingredient.

DETAILED DESCRIPTION OF THE PREFERRED EMBODIMENTS OF THE INVENTION

The method of the invention will advantageously extend the molten service life of any EVAc-based hot-melt adhesive which incorporates a tackifying resin derived from the reaction product of rosin or a rosin derivative with polyols or a mixture of polyols and monoalcohols. These tackifiers are well known to those familiar with the art, as rosin ester tackifiers; see for example U.S. Pat. No. 3,780,013. The rosin employed in the manufacture of said rosin ester tackifiers may be for example, tall oil rosin, gum rosin, wood rosin, or any mixture thereof.

One embodiment of the method of the invention comprises the addition of a compound which is a source of lithium ions, to a molten EVAc adhesive to provide lithium ions therein. Thus, for example, a typical hot-melt adhesive composition of petroleum wax, rosin ester tackifying resin and EVAc which has been observed to exhibit excessive skinning and viscosity increase during use may be improved by dusting into it a compound providing lithium ions. The proportion of compound dusted in may vary over a wide range. Advantageously, a sufficient proportion is used to provide the equivalent of from 0.01 to 5% by weight lithium metal. A larger proportion may be used, but serves no particular purpose. In this embodiment of the invention the lithium compound may be in powdered form for convenience and it may be added with mixing to an adhesive composition during melting or just after it has become molten rather than to a hot melt adhesive which may have been retained for some period of time in the molten state. In the latter instance, oxidative degradation has already been initiated and may be well advanced. Any lithium compound which will provide lithium in a form which will dissolve in the adhesive to provide lithium ion is usable. Representative of such compounds are lithium hydroxide, lithium acetate, lithium carbonate, lithium salts of organic acids and the like. Admixture may be carried out with the assistance of conventional mixing apparatus.

In a preferred embodiment of the invention the inclusion of a reactive form of lithium in the EVAc adhesive is accomplished by providing the lithium ion as a salt of the rosin or rosin derivative tackifier. More specifically, the rosin ester described above or associated organic acids as a component of the EVAc adhesive composition is first reacted with a reactive form of lithium compound so that the lithium ion becomes a chemically combined part of the rosin ester. The term reactive form of lithium is understood to mean lithium hydroxide, lithium carbonate, lithium acetate and the like or any form of lithium capable of reacting under the process conditions used with the rosin acids or other organic acids present to form solubilized lithium soaps. The amount of lithium used in the preferred method of the invention may be such as to provide the equivalent of from 0.01% to 0.10% lithium metal ion in the final adhesive composition with 0.05% being approximately optimum. Larger proportions have no particular advantage. Since rosin ester tackifiers are most commonly used in the range of 35 to 45% of the complete adhesive composition, a range of 0.10 to 0.20% by weight lithium metal ion in the rosin ester will be advantageous for most formulations although wider ranges may be employed if so desired.

It will be appreciated by those skilled in the art that all EVAc hot-melt adhesives should contain organic antioxidants such as the hindered phenolic compounds, triazine derivatives, substituted thiophenols and many other chemical types of which the hindered phenolic compounds are most commonly used. A vast number of such compounds are available and are selected by one familiar with the art for use in hot-melt adhesives on the basis of specific properties required in any particular end use of the adhesive such as resistance to migration into certain substrates, light color, cost, or whatever may be required. Such antioxidants remain essential even though lithium is incorporated in the manner described above, but the effect of lithium is additive to that of the antioxidant. Any antioxidant known to provide a degree of protection for a particular hot-melt adhesive tackified with rosin esters will be markedly enhanced when lithium is used as described above in conjunction with it. The level of the antioxidant may also be significantly reduced to provide a level of protection previously established, but at lower cost. However, the presence of lithium ion alone, in the total absence of antioxidant compounds will not protect an EVAc hot-melt adhesive against oxidative degradation.

The method of the invention also applies to molten mixtures of ethylene-vinyl acetate copolymer, a tackifier resin and a diluent in which the tackifier resin contains 20% or more of chemically combined rosin and the diluent consists of petroleum wax, microcrystalline wax or low molecular weight polyethylene, low molecular weight polypropylene or any mixture of these. The wide variety of ethylene vinyl acetate copolymers and diluent materials are well known; see U.S. Pat. Nos. 3,478,131 and 3,448,178.

It is an advantage of the present invention, whether practiced as the preferred embodiment or practiced by mixing compounds containing soluble lithium into the final adhesive composition, that it gives the rosin ester tackifiers a greater utility than they had previously. Among the tackifying resins such as hydrocarbon resins and phenolic resins, the rosin ester tackifiers are notable for their ability to provide flexible bonds exhibiting high elongation, low temperature flexibility and light color at relatively low cost. The rosin esters, however, have been limited in their use due to their inability to prevent hot melt bodying or viscosity increase and skinning in EVAc adhesives, even with the most judicious selection of antioxidants. The application of the methods of the present invention will provide a higher degree of stability for rosin ester tackified, EVAc hot-melt adhesives.

The following examples describe the manner and process of making and using the invention and set forth the best mode contemplated by the inventor but are not to be construed as limiting. All parts are by weight unless otherwise indicated.

EXAMPLE 1

(A) A suitable reaction flask is charged with 88.65 parts of tall oil rosin (Unitol NCY, Union Camp Corp.), 10.34 parts pentaerythritol and 0.83 parts lithium hydroxide monohydrate. The charge is heated to a temperature of circa 275° C. with stirring under a nitrogen gas atmosphere until condensation proceeds to an acid number of about 20. To the resulting molten mixture there is added 0.18 parts butylated hydroxy toluene. The resulting mixture is cast in pans and allowed to cool to room temperature. The resulting resin has a ring and ball softening point at 95° C., and a lithium metal content of 0.14 percent.

(B) To 40 parts of the resin prepared in (A) above there is added 40 parts of ethylene-vinyl acetate copolymer (Elvax 250, E. I. DuPont) and 20 parts paraffin wax (Petrolite C-700, Petrolite Corporation). The mixture is heated to 350° F., and blended thoroughly. When applied as a molten film or bead, the mixture strongly bonds paper to paper, paper to aluminum foil and aluminum foil to steel. A representative sample of the mixture is maintained molten at a temperature of 350° F. for 96 hours. At the end of that period the melt is observed for viscosity and skinning. The initial viscosity, final viscosity and skinning observation are shown in Table I, below.

EXAMPLE 2

This example is not an example of the invention but is provided for comparative purposes.

The procedure of Example 1, supra, is repeated except that the charge to the reaction flask in (A) consists of 88.47 parts of the tall oil rosin, 11.0 parts of the pentaerythritol and 0.18 parts calcium oxide (dry lime). Condensation is carried out to an acid number of 12. Then 0.35 parts of butylated hydroxy toluene is added to obtain a resin with a ring and ball softening point at 99° C., and no lithium metal content. After admixture with Petrolite C-700 and Elvax 250 in the proportions set forth in Example 1, supra, Part (B) a hot-melt adhesive is obtained with initial and final viscosity (after 96 hours) and skinning as reported in Table 1, below.

TABLE 1

| Adhesive | Example | Control Example |
|---|---|---|
|  | 1 | 2 |
| Initial Viscosity at 350° F. (cps) | 8340 | 8860 |
| Final Viscosity at 350° F. (cps) | 9174 | 10,543 |
| Total Viscosity increase | +10% | +19% |
| Surface Skin Formed After 96 hours at 350° F. | Trace | 100% |

From Table 1 it can be seen that the presence of lithium metal ion has halved the viscosity increase and obviated skin formation after 96 hours. This is in spite of a higher acid number and half as much anti-oxidant, factors which would normally contribute to increased skinning and viscosity increases.

EXAMPLE 3

(A) A suitable reaction flask is charged with 117.5 parts of tall oil rosin (Unitol NCY, Union Camp Corp.), 39.2 parts xylene and 10.2 parts lithium hydroxide monohydrate until a smooth reflux of xylene vapors occurs and water is being collected in a condenser trap. When water evolution ceases, xylene is distilled over to a batch temperature of 250° C. and the batch pressure reduced to 100 mm Hg to dry the product. The pressure is restored to atmospheric with nitrogen gas and 0.2 parts of butylated hydroxy toluene added and thoroughly mixed in. The batch is cast into a pan and cooled. This final product has a ring and ball softening point of 134° C. and acid number of 46, and a lithium metal content of 1.43%.

(B) To 25 parts of part (A) from Example 2 (which contains no lithium) there is added 15 parts of part (A) Example 3 above, 20 parts paraffin wax (Petrolite Crown 700, a 190° F. melting point microcrystalline mineral wax supplied by the Petrolite Corp.) and 40 parts of EVAc copolymer (Elvax 250, an EVAc copolymer containing 27 to 29% vinyl acetate supplied by E. I. DuPont de Nemours & Co.). This mixture is heated to 350° F. and blended thoroughly.

A representative sample of this mixture is maintained molten at 350° F. for 96 hours. At the end of that period, the melt is observed for viscosity and skinning. The results are shown in Table II below:

TABLE II

| Adhesive (Example 3) | |
|---|---|
| Initial Viscosity (cps) | 8650 at 350° F. |
| Final Viscosity (cps) | 8050 at 350° F. |
| Skinning | Less than 10% |

From Table II it is evident that the adhesive containing physically admixed lithium soap compound exhibited much better stability than the control (Example 2) given previously.

EXAMPLE 4

To an electrically heated, stainless steel vessel there is added 20 parts of wax (Petrolite C-700) and 37.1 parts of the rosin ester of Example 2 (which does not contain lithium). When these are melted there is added 40 parts of EVAc (Elvax 250), followed by 2.9 parts of lithium acetate dihydrate powder. This blend is maintained in the molten state for 96 hours at 350° F. after which it exhibits the viscosity change and skin development listed below in Table III.

TABLE III

| Adhesive (Example 4) | |
|---|---|
| Initial Viscosity (CPS) | 10500 |
| Final Viscosity (CPS) | 8950 |
| Skinning | Circa 10% |

This example illustrates that the physically blended lithium acetate provides enough soluble lithium as used in this example to greatly reduce skinning and actually cause the viscosity to decrease compared to the control (Example 2) given previously.

What is claimed is:

1. A method of increasing the molten stability of rosin ester tackified, ethylene-vinyl acetate copolymer based, hot-melt adhesive compositions, which comprises; mixing with said compositions soluble lithium metal ion in a proportion the equivalent of from 0.01 to 5.0 percent by weight of the lithium metal of said compositions.

2. The method of claim 1 wherein said lithium metal ion is provided in a lithium compound which is a salt of an organic acid.

3. The method of claim 2 wherein the lithium compound is a reactive form of lithium such that it will form lithium salts with the organic acids already present in the adhesive composition.

4. The method of claim 1 wherein said lithium metal ion is provided in a rosin tackifier resin salt of lithium.

5. The method of claim 1 wherein said ion is derived from lithium hydroxide.

6. The method of claim 1 wherein said ion is derived from lithium acetate.

7. A hot-melt adhesive composition, which comprises; an ethylene-vinyl acetate copolymer base, a rosin or rosin derivative tackifier, an antioxidant and lithium metal ion in a proportion the equivalent of from 0.01 to 5.0 percent by weight of the lithium metal of said composition.

8. The adhesive of claim 7 wherein said tackifier is the condensation product of tall oil rosin and pentaerythritol.

* * * * *